(12) United States Patent
Perry

(10) Patent No.: US 12,552,440 B2
(45) Date of Patent: Feb. 17, 2026

(54) SKI SLED

(71) Applicant: Robin Perry, Riverside, CA (US)

(72) Inventor: Robin Perry, Riverside, CA (US)

( * ) Notice: Subject to any disclaimer, the term of this patent is extended or adjusted under 35 U.S.C. 154(b) by 285 days.

(21) Appl. No.: 18/506,223

(22) Filed: Nov. 10, 2023

(65) Prior Publication Data

US 2025/0153760 A1    May 15, 2025

(51) Int. Cl.
*B62B 13/18* (2006.01)

(52) U.S. Cl.
CPC .................................. *B62B 13/18* (2013.01)

(58) Field of Classification Search
CPC ..... B62B 13/18; B62B 15/008; B62B 15/009; B62B 17/02; B62B 19/00; B62B 19/02
See application file for complete search history.

(56) References Cited

U.S. PATENT DOCUMENTS

| | | | | |
|---|---|---|---|---|
| 2,589,602 | A * | 3/1952 | Rae ......................... | B62B 19/02 280/13 |
| 3,521,897 | A * | 7/1970 | Lechner .................. | B62B 13/18 280/20 |
| 4,251,085 | A | 2/1981 | Lageer | |
| 4,778,190 | A * | 10/1988 | Meredith ................ | B62B 13/18 280/8 |
| 5,911,422 | A * | 6/1999 | Carpenter ............... | B62B 13/18 280/10 |
| 6,474,097 | B2 | 11/2002 | Treppedi | |
| 6,986,807 | B2 | 1/2006 | Brunk | |
| D649,611 | S | 11/2011 | Ollila | |
| 8,256,156 | B1 * | 9/2012 | Burgoyne, Jr. ......... | A45C 11/20 280/7.14 |
| 9,260,129 | B2 | 2/2016 | Chancellor | |
| 9,340,224 | B2 | 5/2016 | Yoder | |
| 2002/0095947 | A1 * | 7/2002 | Treppedi ................. | B62B 13/18 62/457.3 |
| 2010/0289231 | A1 | 11/2010 | Huot | |
| 2015/0084291 | A1 * | 3/2015 | Yoder .................... | B62B 15/008 280/8 |
| 2016/0368518 | A1 * | 12/2016 | Farina ..................... | B62B 13/18 |
| 2019/0270475 | A1 * | 9/2019 | Wilkins ................. | B62B 13/18 |
| 2019/0329811 | A1 * | 10/2019 | Jones ........................ | B62B 5/00 |
| 2021/0129887 | A1 * | 5/2021 | Walker .................... | B62B 9/142 |

FOREIGN PATENT DOCUMENTS

CA        2704321        11/2011

* cited by examiner

*Primary Examiner* — Brian L Swenson

(57) ABSTRACT

A ski attachment for a wheeled insulated cooler which includes a left ski and a right ski and an upturned flange on each that is biased towards the inner edge of the ski. The upturned flange and a bracket are coordinated to allow a fastener to attach the bracket to the upturned flange. The bracket captures an axle and allows free rotation of the axle when the skis are connected to the axle. The bracket captures the axle to prevent the axle from being dislodged from the bracket on the ski. The ski is wide enough and long enough to provide sliding support for the insulated portable cooler over surfaces where wheels aren't useable.

5 Claims, 9 Drawing Sheets

SKI SLED

I. BACKGROUND OF THE INVENTION

1. Field of the Invention

Figure 1:
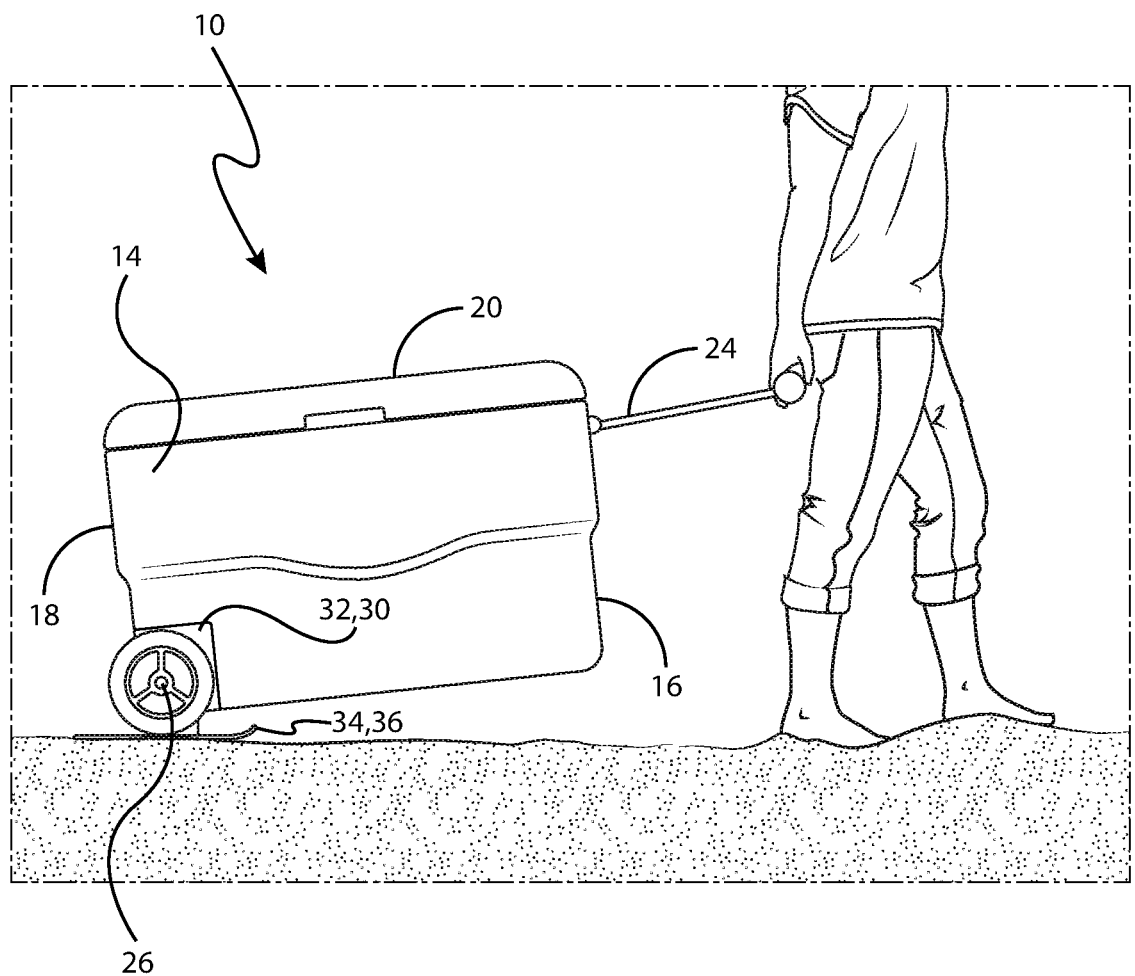

The present invention relates to the field of providing smooth skis for portable ice chests. The skis are small and snap onto the wheel axle of the ice chest. The novelty is that the skis are easily removable from the ice chest and provide the ability of the ice chest to slide along surfaces that are not conducive to wheeled ice chests.

2. Description of the Prior Art

In the following detailed description preferred embodiments of the invention will be described. However, it is to be understood that features of the different embodiments are exchangeable between the embodiments and may be combined in different ways, unless anything else is specifically indicated. It may also be noted that, for the sake of clarity, the dimensions or certain components illustrated in the drawings may differ from the corresponding dimensions in real-life implementations. Even though in the following description, numerous specific details are set forth to provide a more thorough understanding or the present invention, it will be apparent to one skilled in the art that the present invention may be practiced without these specific details. In other instances, well known constructions or limitations are not described in detail, so as not to obscure the present invention.

The current state of the art in portable ski coolers would have varying length skis. Some use door type hinges that are locked in the "closed" non-used position, and when needed the left and right skis are deployed down to allow the ice chest to smoothly slide over the surface. One readily apparent disadvantage of prior art is that some require mechanical attachment to the ice chest or cooler. This disadvantage becomes apparent when the owner considers the additional storage volume lost due to the mechanical hinge and the left and right ski extending beyond the sides of the cooler or ice chest.

Other ski attachment devices use a vertically extendable handle that also has a very wide ski that is hinged downwards when deployed. The ski member is curved to be situated beneath the wheels when in use so that the user, when dragging the cooler, allows the ski to slide against the ground as opposed to allowing the wheels to be used. The wide ski can be stowed in place when not used. A key feature of that design is that the ice chest or cooler rests upon a 2 wheel cart and is secured using a tie-down strap. A definite disadvantage of that design is the size and volume used for the cart and the ice chest or cooler.

Another patent discloses an "Angler Cooler Apparatus" which uses removable skis. A key difference between this prior art reference and the present invention is that the skis use a pair of spring-loaded clips to engage the circumferential edges of the wheels to allow the skis to elevate the wheels above the ground surface during transport. The present invention uses a different method to attach the skis to elevate the wheels above the surface an allow the skis to smoothly slide along the ground.

Further prior art embodiments show that the ice chest or cooler has at least 1 ski runner which has attached wheels and recesses in the ski runner for the wheels and where the ski runner is sized for the ice chest or cooler. The ice chest or cooler additionally has recesses for receiving the wheels of the ski runners. The ski runners are attached with multiple retainer pins. The retainer pins use complimentary holes in the ice chest or cooler to attach the ski runners and wheels. The present invention doesn't have any wheels or requirements for retainer pins to attach the ski runners of the instant invention to the ice chest or cooler. A simple metallic or plastic "E" clip is all that is required.

Other prior art embodiments use a full-length skid that extends from one wheel to the opposing wheel and is concave to allow the wheels to sit therein. The user would just pull the ice chest or cooler and the full width concave skid would allow the cooler to move over ground not suited for wheels.

SUMMARY OF THE INVENTION

The current state of the art of ski-like members for ice chests and wheeled insulated coolers are very cumbersome to use or adapt. They are either full length of the ice chest or wheeled insulated cooler, full width of the ice chest or wheeled insulated cooler, mounted on the side of the ice chest or wheeled insulated cooler and need to be rotated and locked into position to be useable.

The present invention uses smaller skis, that are approximately 12 inches or less in length, the width can be 3 to 4 inches. There is a right- and left-hand ski that has a flange that extends upwards from an inner edge of the ski. There would be an attached plate that is pivotably secured onto the flange and terminates in a plastic or metallic "E" clip that is narrow enough to fit between the inner surface of the wheel and the body of the ice chest or wheeled insulated cooler. The "E" clip would snap onto the axle of the wheel and the wheel would rest on the ski allowing the user to pull the ice chest or wheeled insulated cooler along the ground where wheels wouldn't be used.

II. BRIEF DESCRIPTION OF THE DRAWINGS

FIG. 1. Shows a user pulling the ice chest or wheeled insulated cooler along an irregular surface.

Figure 2:
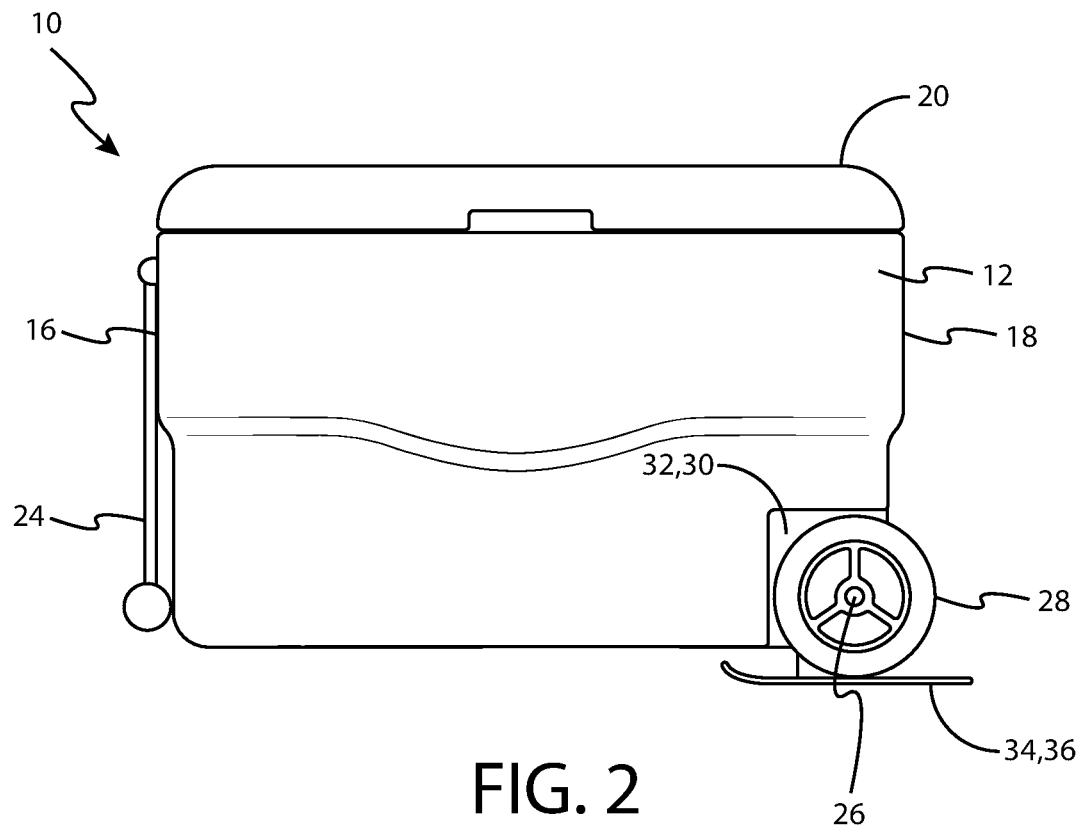

FIG. 2. Shows left side view of the ice chest or wheeled insulated cooler with the skis attached.

Figure 3:
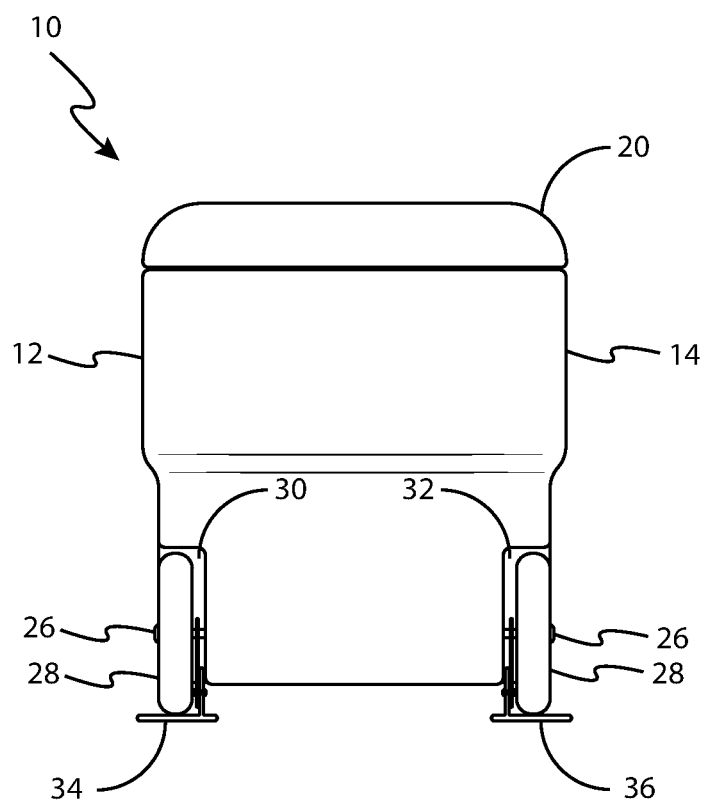

FIG. 3. Shows a rear view of the ice chest or wheeled insulated cooler with the skis attached showing the left-handed and right-handed skis.

Figure 4:
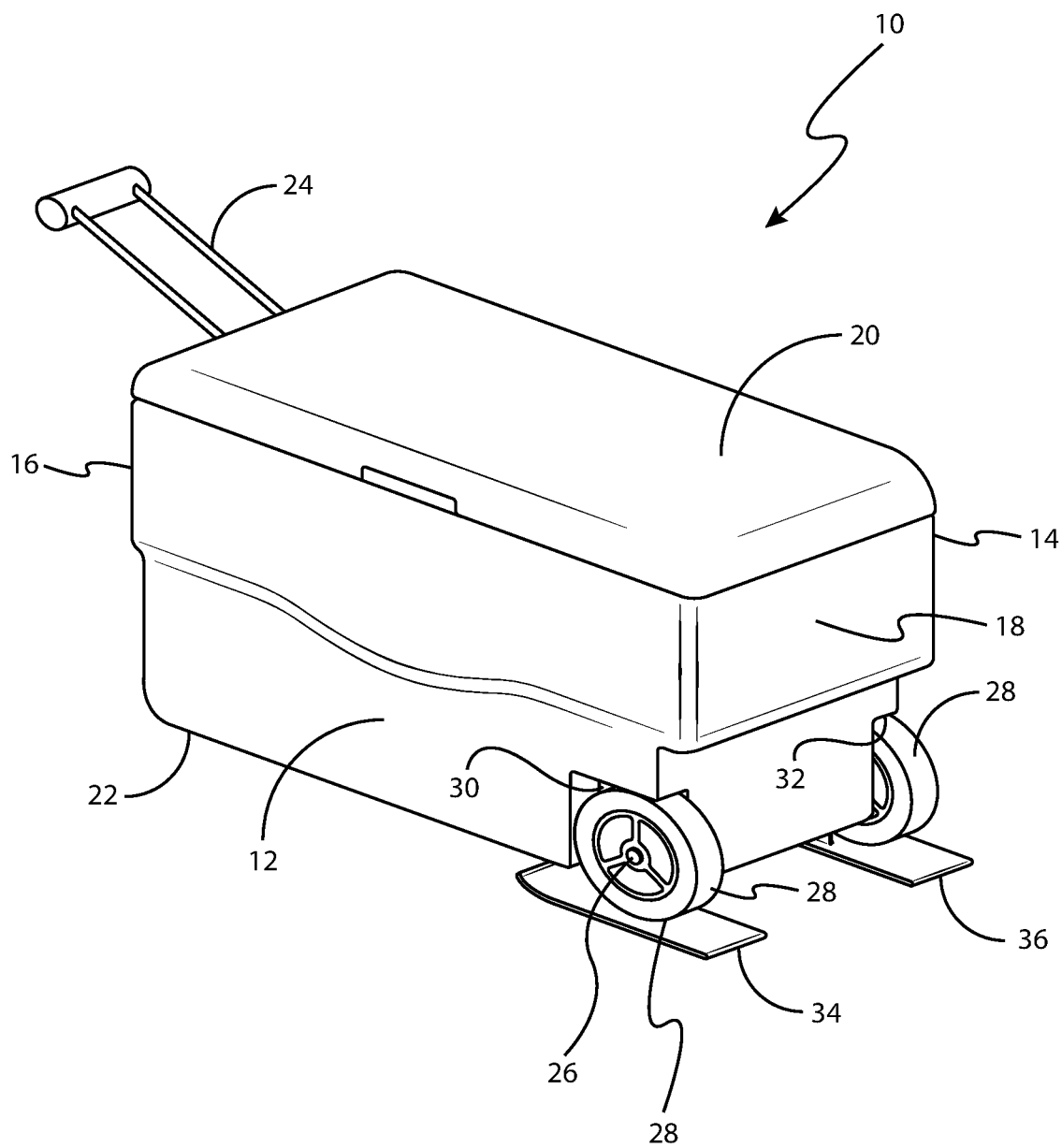

FIG. 4. Shows a rear perspective of the ice chest or wheeled insulated cooler with the skis attached.

Figure 5:
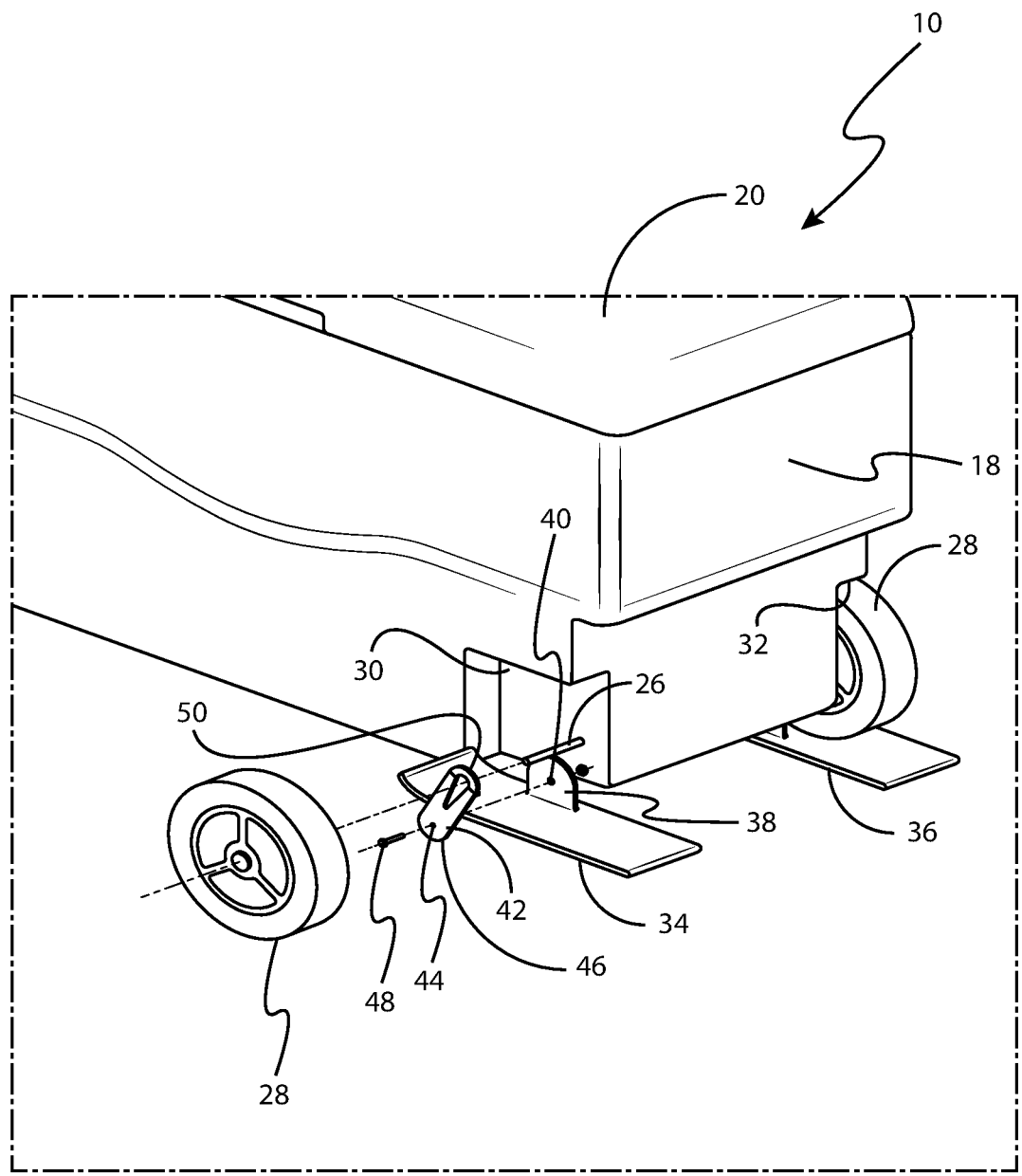

FIG. 5. Shows an exploded perspective view of the ski and it's relative components.

Figure 6:
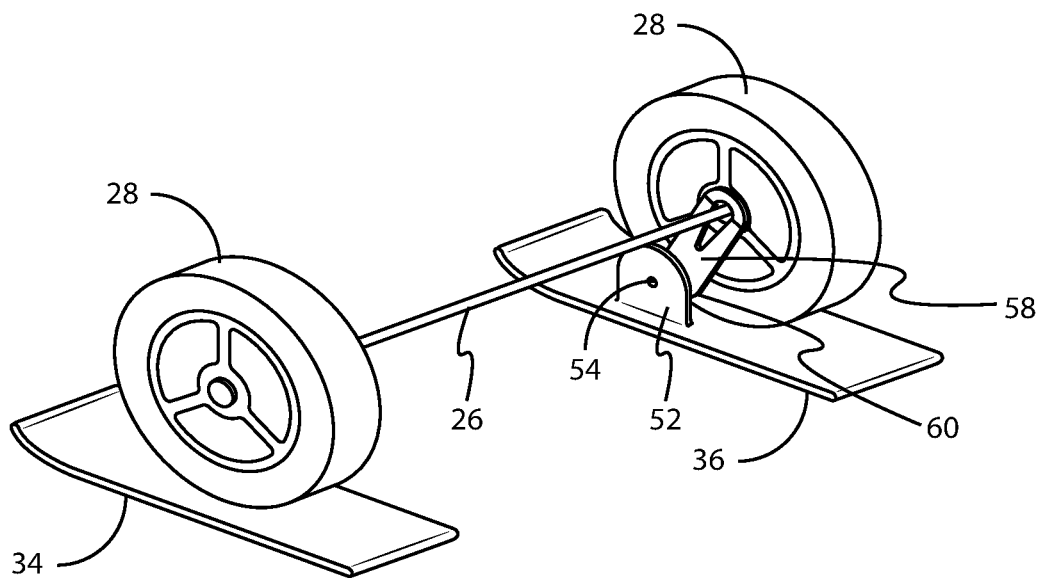

FIG. 6. Shows a perspective view of the skis attached to the axle without the ice chest or wheeled insulated cooler visible.

Figure 7:
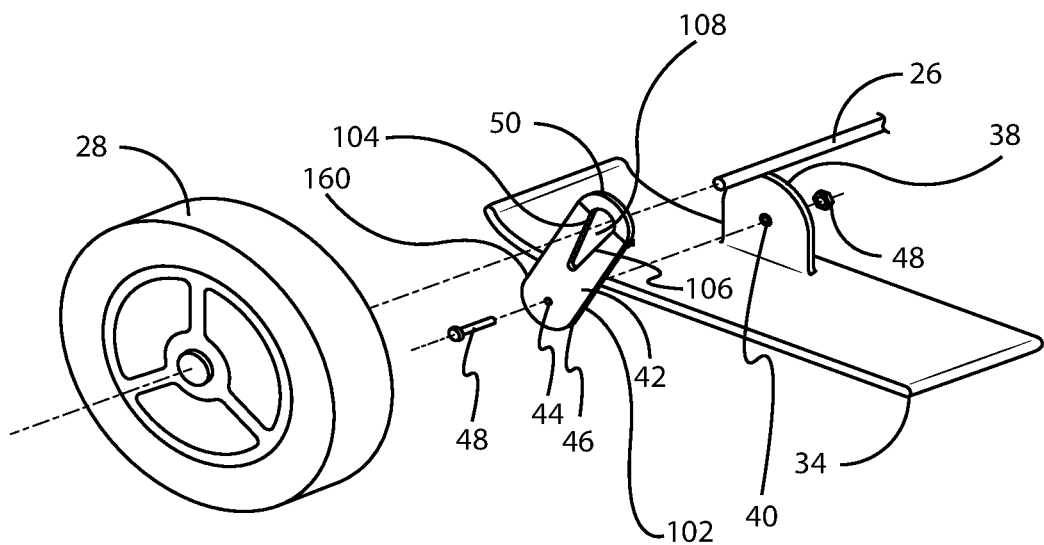

FIG. 7. Shows a closer exploded perspective view of the ski and it's relative components.

Figure 8:
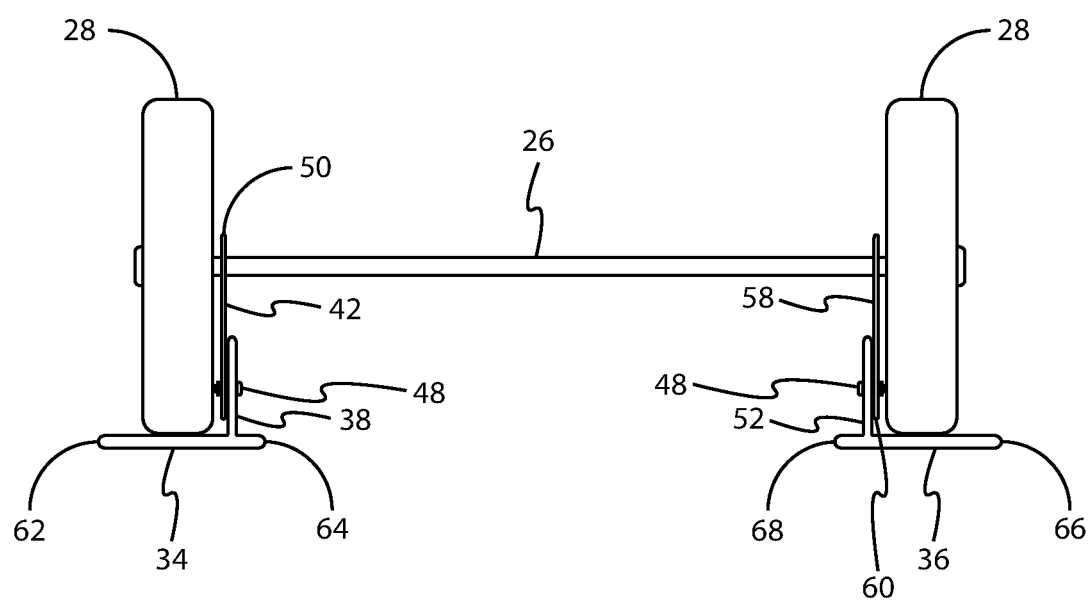

FIG. 8. Shows a left-handed view of the wheel and ski.

Figure 9:
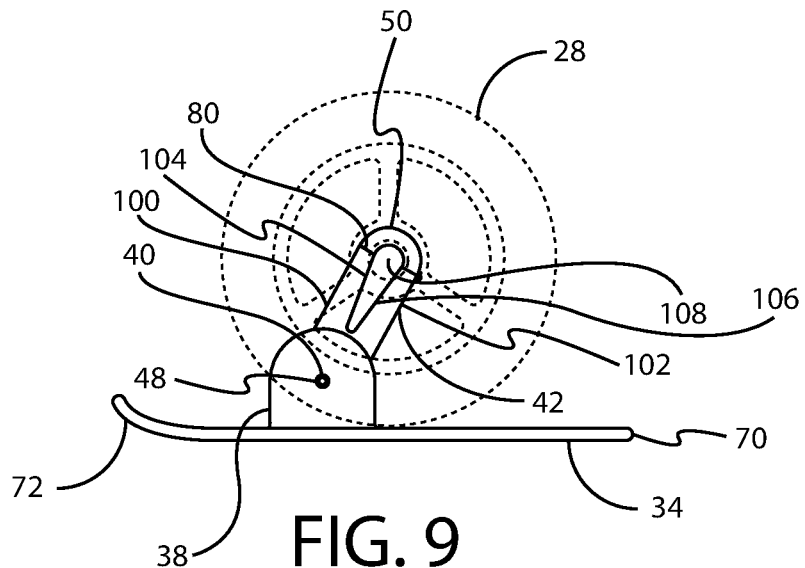

FIG. 9. Shows a view of the left ski and its components with the wheel hidden.

Figure 10:
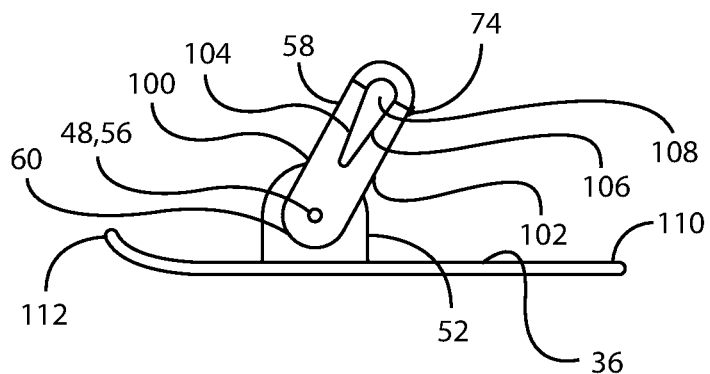

FIG. 10. Shows a view of the right ski and its components with the wheel hidden.

Figure 11:
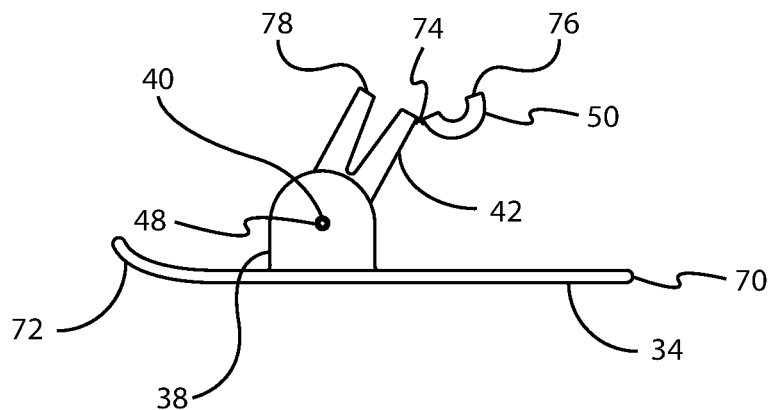

FIG. 11. Shows the ski and its components with the "E" clip open.

Figure 12:
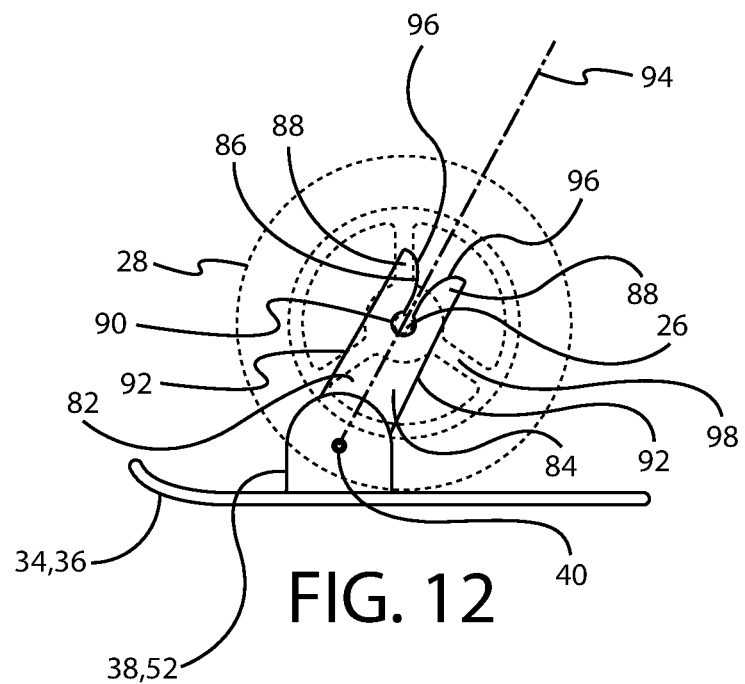

FIG. 12. Shows a hook to capture the axle.

Figure 13:
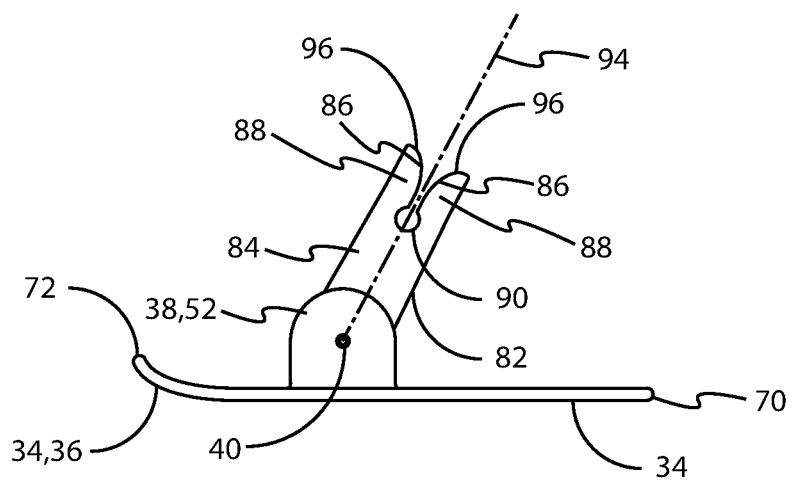

FIG. 13. Shows a hook to capture the axle.

Figure 14:
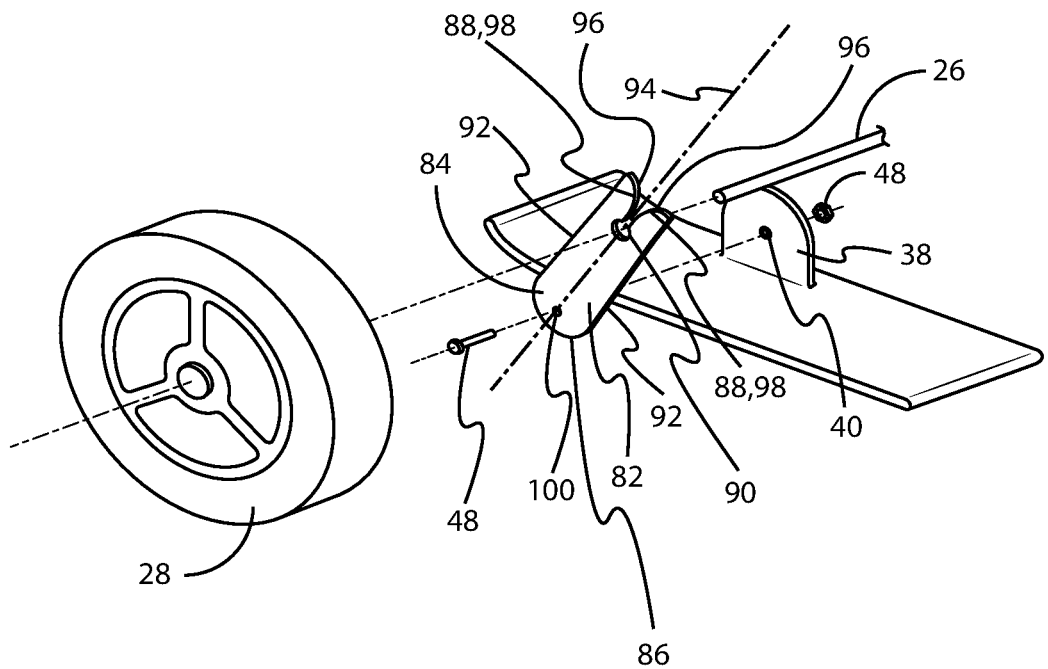

FIG. 14. Shows an exploded view of the hook to capture the axle.

III. DETAILED DESCRIPTION OF THE PREFERRED EMBODIMENTS

FIG. 1 shows the Applicant's invention in operation. An wheeled insulated cooler (10) with a pivotable handle (24) being pulled by a user. A left ski (34) and a right ski (36) are shown providing sliding support over an uneven surface such as sand at a beach, or dirt in an unimproved area.

FIG. 2 shows a left side view of the wheeled insulated cooler (10). The wheeled insulated cooler (10) has a left side (12), a right side (14), a front side (16), a back side (18), a top (20), and a bottom (22). The top (20) of the wheeled insulated cooler (10) may be hinged to facilitate easy access to the contents of the wheeled insulated cooler (10). On the front side (16) of the wheeled insulated cooler (10) the pivotably mounted is a handle (24) is placed and allows a user to pull the wheeled insulated cooler (10) along. The pivotably mounted handle (24) may be extendable for ease of use. Towards the back side (18) of the wheeled insulated cooler (10) an axle is shown (26), where the axle penetrates through the left and right sides (12, 14) of the wheeled insulated cooler (10) and provides an area to mount a wheel (28) biased towards the left side (12) and a wheel biased towards the right side (14) of the wheeled insulated cooler (10).

Shown in FIG. 3 it is noted that the left and right sides (12, 14) of the wheeled insulated cooler (10) each has a left and right recess (30, 32) defined therein. The recesses (30, 32) allow the wheels (28) to be located inside assuring that the wheeled insulated cooler (10) isn't wider due to the addition of the wheels (28).

FIG. 4 shows an isometric perspective of the wheeled insulated cooler (10). Shown in the isometric view are the left side (12), the right side (14), the front side (16), the back side (18), the top (20), and the bottom (22). The wheels are (28) shown attached to the axle (26). Also shown in the isometric view is the left ski (34) and the right ski (36). The wheel (28) is shown positioned within the recess (30) on the left side (12) of the cooler. The wheel (28) is also shown positioned within the recess (32) on the right side (14) of the cooler (10). The left ski (34) and the right ski (36) are essentially parallel to each other and where the left ski (34) and the right ski (36) are substantially parallel to the left side (12) and the right side (14) of the insulated cooler (10). The left ski (34) and the right ski (36) are removably connected to the axle (26) of the insulated cooler (10).

FIG. 5 shows an exploded left side view of how the wheel (28), axle (26), and left ski (34), are attached to the wheeled insulated cooler (10). The left ski (34) is shown with a upward rising flange (38) where the upward rising flange (38) has a hole (40) defined therein to allow a bracket (42) with a corresponding hole (44) in a lower portion (46) using a fastener (48) to attach onto the upward rising flange (38) of the left ski (34). As is shown in FIG. 5, the bracket (42) has an upper portion (50) where the upper portion is adapted to be secured to the axle (26) and the bracket (42) will then be held captive between the wheel (28) and the left recess (30).

FIG. 6 shows the Applicant's invention without the insulated cooler (10). The right ski (36) is shown with an upward rising flange (52) that is biased towards the right side (14) of the wheeled insulated cooler (10). The upward rising flange (52) of the right ski (36) has a hole (54) defined therein. A second bracket (58) is shown, where the second bracket (58) is similar to the bracket (42) used on the left ski (34), and has a fastener hole (56) (hidden in view) coordinated with the hole (54) in the upward rising flange (52) of the right ski (36) defined therein, the fastener hole (56) is biased towards a lower portion (60) of the second bracket (58).

FIG. 7 shows an exploded left side view of how the wheel (28), axle (26), and left ski (34), are oriented to the left ski (34). The left ski (34) is shown with the upward rising flange (38) where the hole (40) in the upward rising flange (38) shows how the fastener (48) attaches the bracket (42) with the corresponding hole (44) to attach onto the upward rising flange (38) of the left ski (34). In this specific figure the fastener (48) consists of a screw and a nut but may be a rivet.

As shown in FIG. 7, the bracket (42) is shown having a forward edge (100) and an aft edge (102) where the forward and aft edges (100, 102) may be parallel, or as shown as being outward facing and non-parallel. Internal to the bracket (42) we show a forward inner edge (104) and an aft inner edge (106) where the forward inner edge (104) and the aft inner edge (106) define a cavity (108) therebetween to capture the axle (26). The lower portion (46) of the bracket (42) is shown as having an arcuate shape, where the arcuate shape is tangential to the forward and aft edges (100, 102) of the bracket (42). The hole (44) in the bracket is placed at the center of the arcuate shaped lower portion (46) of the bracket (42). The upper portion (50) of the bracket (42) is arcuate shaped and shows a hinge (74) positioned on the back of the left and right ski (34, 36), which defines a means to attach the bracket (42) to the axle (26) which will then be held captive between the wheel (28) and the left recess (30). As shown, when the upper portion (50) is closed the cavity (108) will allow the axle to freely rotate within.

The upper portion (50) of the bracket (42) defines the means to secure the bracket (42) and hence the ski (34) to the axle (26) and therefore the wheeled insulated cooler (10).

FIG. 8 shows a view of the wheels (28), axle (26), left ski (34), right ski (36), and bracket (42), and second bracket (58) which is shown being used on the left ski (34), and the right ski (36). The left ski (34) and the right ski (36) have a width that is greater than the wheel (28) on an outboard edge (62) on the left ski (34) and extends beyond the upward rising flange (38) on an inboard edge (64) of the left ski (34). The width of the right ski (36) also has an outboard edge (66) that is greater than the wheel (28) for the right ski (36) and an inboard edge (68) that extends beyond the upward rising flange (52) of the right ski (36).

Continuing with FIG. 9, we see that the left ski (34) has a rear edge (70) where the rear edge (70) of the left ski (34) extends beyond the wheel (28). The left ski (34) has an upward rising forward edge (72) where the upward rising forward edge (72) of the left ski (34) is adapted to prevent debris such as sand, dirt, or rocks from gathering on the left ski (34). The upward rising forward edge (72) can be straight as depicted in the drawings or may come together in a point that is similar to what is used on snow skis. The upward rising flange (38) is shown. The bracket (42) is shown attached to the upward rising flange (38) with a fastener (48). The bracket (42) is shown with the upper portion (50) wrapping around the axle (26) of the cooler (20). FIG. 10 shows the right ski (6) without the wheel (28) and axle (26) shown. We see the rear edge (110) of the right ski (36) and the upward rising edge (112) of the right ski (36). The upward rising flange (52) is shown attached to the right ski (36). The bracket (58) is shown attached to the upward rising flange (52) with a fastener (48). The bracket (58) is shown with the upper portion (114) that can wrap around the axle (26). Shown between the upper portion (114) of the bracket (58) and the lower portion (60) of the bracket is a hinge means (74). The hinge means (74) allows the upper portion (114) of the bracket (58) to rotate away from the lower portion (60) of the bracket (58) thus allowing a user to easily place the right ski (36) to be attached to the axle (26) between the wheel (28) and the right recess (32) of the wheeled insulated cooler (10). Since the bracket shown (42) for the left ski (34) is generally a mirror opposite of the bracket (58) used on the right ski (36) the forward edge (100), aft edge (102), forward inner edge (104), aft inner edge (106), and cavity (108) are as defined for the left bracket (42).

FIG. 11 shows the left ski (34) without the wheel (28) and axle (26) shown. We see that the rear edge (70) of the left ski (34), the upward rising edge (72) of the left ski (34), and the upward rising flange (38) are shown. The bracket (42) is shown attached to the upward rising flange (38) with the fastener (48). The bracket (42) is shown with the upper portion (50) that may wrap around the axle (26) but is shown with the upper portion of the bracket (42) shown with the upper portion (50) of the bracket (42) rotated about a hinge means (74). The axle (26) is allowed to freely rotate when it is positioned within the bracket (42) when captured by the upper portion (50) of the bracket (42). The upper portion (50) of the bracket (42) has a first mating face (76) that mates with a second mating face (78) that is located on the bracket (42). The upper portion (50) and the bracket (42) are maintained in a closed position using a securing means (80), where the securing means (80) is a clasp (not shown) or an interlocking snap (not shown).

FIG. 12 shows another means to secure a bracket (82) to the axle (26). The bracket (82) has a body (84) that extends and ends in a shape that contains an arc-like shape (86) that is mirrored about a centerline (94) of the bracket (82), and is adapted to provide a guide portion (88) that constricts and prevents the axle (26) from easily being dislocated from the axle (26). The axle (26) is held in place with a circular shaped cavity (90) where the circular shaped cavity (90) is designed to allow the axle (26) to freely rotate and holds the axle (26) in place. The constriction of the guide portion (88) prevents the axle (26) from being dislocated from the circular shaped cavity (90).

FIG. 13 shows further shows the embodiment to secure a bracket (82) to the axle (26) without showing the wheel (28). The bracket's (82) body (84) extends and ends in an arc-like shape (86) that will not bind up when the bracket (82) is inserted around the axle (26). The mirrored portion of the bracket (82) shows that the guide portion (88) constricts and prevents the axle (26) from easily being dislocated by capturing the axle (26). The axle (26) is held in place with a circular shaped cavity (90) where the circular shaped cavity (90) rotatably allows the axle (26) to be held in place and the constriction of the guide portion (88) prevents the axle (26) from being dislocated from the circular shaped cavity (90).

FIG. 14 shows an exploded view of an installation of the bracket (82) with the axle (26) and the wheel (28). A more detailed description of the bracket (82) is as follows.

The bracket (82) is shown as having a body (84), where the body (84) has a pair of edges (92) that may be parallel but are positioned similarly about a centerline (94), and end in an arc shape (86) that is tangent to both edges (92). The edges (82) of the bracket (82) extend upwards which allows a radial relief (96) which is adapted to prevent binding when the axle (26) is inserted and when in use. The guide portions (88) have an arc or spinal shape (98) that is convex shaped towards each other shown as mirrored about the centerline (94) of the bracket (82) and by design constricts the space therebetween and is shaped to allow the axle (26) to be captured in the circular shaped cavity (90) when the axle (26) is inserted between the guide shapes (88) for use the guide portions (88), which are defined to allow a user to force the axle (26) through. The guide portions (88) terminate in the circular cavity (90) that is tangentially connected to the guide portions (88). The bracket (82) has a hole (100) that allows a fastener (48) to fix the bracket (82) to the left and right ski (34, 36).

It must be noted that the left ski (34) and the right ski (36) are designed to be mirror opposites to assure that the left and right ski (34, 36) correctly fit on the opposing sides of the cooler (10). The brackets (52, 58) and generally are designed to be identical to each other to prevent excessive costs and to provide fewer costs of inventory. The bracket (82) has been shown as being useable for the left ski (34) and the right ski (36).

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

What is claimed is:

1. A ski sled for an insulated cooler comprising:
   a. a left ski and a right ski, the left and right ski being removably connected to an axle of a wheeled insulated cooler with a bracket, the bracket being connected to the left ski and the right ski;
   b. the left ski and the right ski each having an outboard edge and an inboard edge, the outboard edge and the inboard edge of the left ski and the right ski each being wider than the width of a wheel of an wheeled insulated cooler, the left ski and the right ski each has an upward rising flange defined thereon, where the upward rising flange is biased towards the inboard edge of the left ski and the right ski, the upward rising flange of the left ski and the right ski each has a hole defined therein, the hole in the upward rising flange being adapted to allow the bracket to be attached thereon;
   c. the bracket has a lower portion, where the lower portion of the bracket is arcuate shaped and has a hole defined therein, the hole in the lower portion being centrally positioned in the arcuate shape of the lower portion of the bracket and is adapted to attach onto the upward rising flange of the left and right ski, the bracket has means to capture an axle of the insulated cooler and allow the free rotation of the axle thereby;
   d. the left and right ski each has a rear edge, the rear edge of the left and right ski extends beyond the wheel of the insulated cooler, the left and right ski each further has an upward rising forward edge, where the upward rising forward edge of the left and right ski is adapted to prevent debris from gathering on the left and right ski.

2. The ski sled for a wheeled insulated cooler of claim 1, wherein the upward rising forward edge of the left ski is straight.

3. The ski sled for a wheeled insulated cooler of claim 1, wherein the upward rising forward edge of the left ski is pointed.

4. The ski sled for a wheeled insulated cooler of claim 1, wherein;
   a. the means for the bracket to capture the axle the bracket is the bracket having a forward inner edge and an aft inner edge, the forward and aft inner edge defining an inner cavity therebetween, the upper portion of the bracket has a hinge, where the hinge is positioned on the rear portion of the bracket and allows the upper portion of the bracket to rotate away allowing the axle of the insulated cooler to be inserted or removed, the upper portion is further adapted to be secured to the axle of the insulated cooler, the bracket further will then held captive between the wheel and the a left and a right recess of the insulated cooler.

5. The ski sled for a wheeled insulated cooler of claim 1, wherein;
   a. the means for the bracket to capture the axle is the bracket body, having a pair of edges, the pair of edges of the bracket body are positioned similarly about a centerline, the edges of the bracket meet at the bottom end in an arc shape that is tangent to both edges;
   b. the edges of the bracket extend upwards which allows for a radial relief to be defined and which is adapted to prevent binding when the axle of the insulated cooler is inserted and when in use;
   c. the bracket further has guide portions defined thereon where the guide portions have an arc or spinal shape that is convex shaped towards each other and shown as mirrored about the centerline of the bracket and by design constricts a defined space therebetween and is has a circular cavity defined therein that is shaped to allow the axle to be captured within the circular shaped cavity when the axle is inserted between the guide shapes when in use;
   d. the guide portions are adapted to allow a user to force the axle therethrough, the guide portions terminate in the circular cavity, the circular cavity being tangentially connected to the guide portions of the bracket, the bracket arc shaped bottom ed of the bracket has a hole defined therein, the hole is adapted to allows a fastener to fix the bracket to upward flange of the left and right ski.

\* \* \* \* \*